United States Patent
Schuette

(10) Patent No.: US 8,331,123 B2
(45) Date of Patent: Dec. 11, 2012

(54) HIGH PERFORMANCE SOLID-STATE DRIVES AND METHODS THEREFOR

(75) Inventor: Franz Michael Schuette, Colorado Springs, CO (US)

(73) Assignee: OCZ Technology Group, Inc., San Jose, CA (US)

( * ) Notice: Subject to any disclaimer, the term of this patent is extended or adjusted under 35 U.S.C. 154(b) by 157 days.

(21) Appl. No.: 12/886,771

(22) Filed: Sep. 21, 2010

(65) Prior Publication Data

US 2011/0069526 A1 Mar. 24, 2011

Related U.S. Application Data

(60) Provisional application No. 61/244,266, filed on Sep. 21, 2009.

(51) Int. Cl.
*G11C 5/06* (2006.01)
(52) U.S. Cl. ...... 365/63; 365/149; 365/150; 365/185.33
(58) Field of Classification Search ................... 365/63, 365/149, 150, 185.33
See application file for complete search history.

(56) References Cited

U.S. PATENT DOCUMENTS

| | | | | |
|---|---|---|---|---|
| 5,737,746 | A * | 4/1998 | Hardin et al. | 711/118 |
| 7,028,141 | B2 * | 4/2006 | Ohba | 711/119 |
| 7,188,217 | B2 * | 3/2007 | Jeddeloh | 711/118 |
| 8,095,834 | B2 * | 1/2012 | Roohparvar et al. | 714/718 |
| 2006/0005053 | A1 * | 1/2006 | Jones et al. | 713/300 |

* cited by examiner

*Primary Examiner* — Pho M Luu
(74) *Attorney, Agent, or Firm* — Hartman Global IP Law; Gary M. Hartman; Domenica N. S. Hartman

(57) ABSTRACT

A nonvolatile storage device adapted for use with computers, workstations and other processing apparatuses. The storage device includes a printed circuit board, a nonvolatile memory array comprising at least two sub-arrays that contain nonvolatile solid-state memory devices, and control circuitry for interfacing with the processing apparatus. The control circuitry includes an abstraction layer and at least two memory control units configured to communicate data, address and control signals with the sub-arrays of the memory devices. A bus connects each memory control unit to a corresponding one of the sub-arrays. The control circuitry further includes a crossbar switch that functionally connects each memory control unit to the abstraction layer. The storage device is capable of overcoming limitations of current SSD designs by enabling independent read and write transfers (accesses) to the memory devices of the storage device, including concurrent read and write accesses.

20 Claims, 3 Drawing Sheets

HIGH PERFORMANCE SOLID-STATE DRIVES AND METHODS THEREFOR

CROSS REFERENCE TO RELATED APPLICATIONS

This application claims the benefit of U.S. Provisional Application No. 61/244,266, filed Sept. 21, 2009, the contents of which are incorporated herein by reference.

BACKGROUND OF THE INVENTION

The present invention generally relates to memory devices for use with computers, including personal computers, workstations and other processing apparatuses. More particularly, this invention relates to high speed nonvolatile or permanent memory-based mass storage devices whose performance can be enhanced by providing banks of nonvolatile memory devices and independent memory controllers, wherein each controller is operable to access each bank via a crossbar switch. The controllers are functionally completely independent of each other, allowing concurrent read and write accesses to the nonvolatile memory devices.

Mass storage devices, such as advanced technology (ATA) or small computer system interface (SCSI) drives, are rapidly adopting nonvolatile (or permanent) memory technology, such as flash memory or other emerging solidstate memory technology (commonly referred to as solid-state drives, or SSDs), including but not limited to phase change memory (PCM), resistive random access memory (RRAM), magnetoresistive random access memory (MRAM), ferromagnetic random access memory (FRAM), organic memories, or nanotechnology-based storage media such as carbon nanofiber/ nanotube-based substrates. Currently the most common technology uses NAND flash memory as inexpensive storage memory.

The performance of current SSDs is limited by several factors. In sequential transfers, that is, either reads or writes of contiguous blocks of data, the host transfer rate sets an effective limitation for the achievable data exchange between the device and the host. The transfer of data between the drive's controller on the device side and the host bus adapter (in most cases a SATA controller) on the motherboard is currently limited to 3.0 Gbit/sec, which translates into a roughly 280 MB/sec (including protocol overhead) real-world transfer limitation.

Sequential transfers of large data blocks are important for certain classes of applications, a notable but nonlimiting example of which is editing of audiovisual content streams. However, especially in the case of system drives, that is, drives that contain the operating system (OS), house-keeping data are frequently written back to the drive. In most cases those data blocks are in the order of about 4 to about 32 kilobytes (kB). Moreover, the access of these data in both read and write scenarios is highly random.

Particularly in the case of NAND flash memory, any random access incurs an initial latency of the flash memory device on the order of approximately 50 to 100 microseconds. Some of these latencies can be hidden by temporarily storing small data blocks in the drive's cache and then combining them to larger chunks of data to increase the write efficiency and decrease what is known as write magnification. Write magnification means the amount of data written by the controller to the memory devices divided by the data transferred from the host to the device. Since every write access incurs a minimum amount of a page of NAND flash memory being written, write combining is an efficient and necessary protocol to reduce the write amplification factor by combining small data fragments to match the page size within a NAND flash memory array.

In the case of mixed read-write workloads of small data, the overall transfer rates become limited by switching latencies of the controller and, moreover, initial access latencies of the NAND flash memory. This effectively limits the performance of system drives.

BRIEF DESCRIPTION OF THE INVENTION

The present invention provides a nonvolatile storage device adapted for use with computers, workstations and other processing apparatuses. The storage device is capable of overcoming limitations of current SSD designs by enabling concurrent independent read and write transfers (accesses) to nonvolatile memory devices of the storage device, preferably for the purpose of substantially increasing overall drive performance and, by extension, system performance, which has been increasingly limited by I/O performance of permanent storage media of types used in SSDs.

According to a first aspect of the invention, the nonvolatile storage device includes a printed circuit board, a nonvolatile memory array comprising at least two sub-arrays that contain nonvolatile solid-state memory devices, and control circuitry for interfacing with the processing apparatus. The control circuitry includes an abstraction layer and at least two memory control units configured to communicate data, address and control signals with the sub-arrays of the memory devices. A bus connects each memory control unit to a corresponding one of the sub-arrays of the memory devices. The control circuitry further includes a crossbar switch that functionally connects each memory control unit to the abstraction layer.

Another aspect of the invention is a method of increasing performance of a nonvolatile storage device. The method includes using at least two independent memory control units, each being functionally connected by a separate bus to a separate memory sub-array that contains at least one nonvolatile solid-state memory device, and both being connected to a host system interface controller and an abstraction layer via a crossbar switch.

In view of the above, it can be seen that a significant advantage of this invention is that the nonvolatile storage device allows concurrent read and write accesses to the nonvolatile memory devices, while further allowing the devices to be conventional nonvolatile memory components, for example, flash memory components. This configuration further allows one of the controllers to serve system requests, while allowing another of the controllers to perform house-keeping functions during, for example, periods of light load. Such house-keeping functions may include coalescing of old data for the purpose of garbage collection, and subsequent reclaiming of the blocks through TRIM functionality.

Other aspects and advantages of this invention will be better appreciated from the following detailed description.

DETAILED DESCRIPTION OF THE INVENTION

Figure 1:
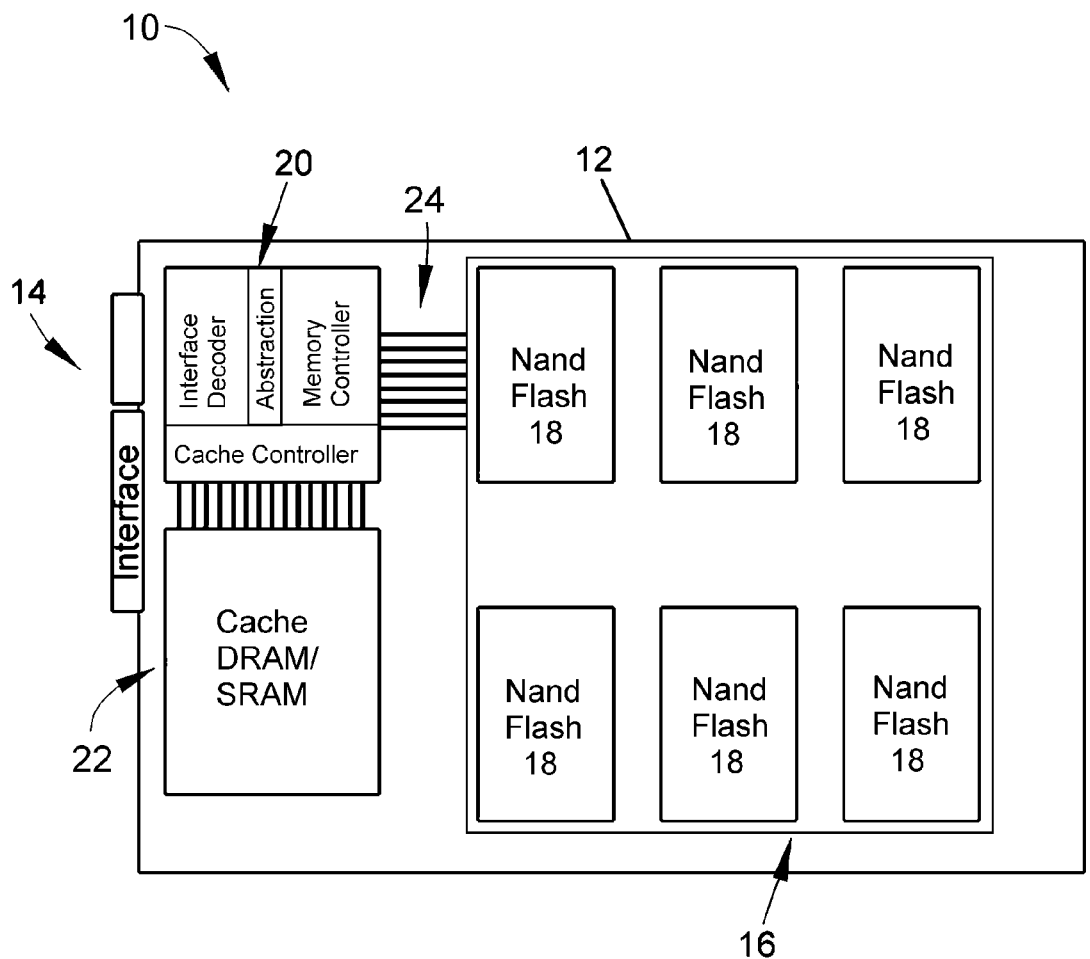
FIG. 1 schematically represents a current standard design of a solid-state drive equipped with nonvolatile memory devices.

The present invention is generally applicable to computers and other processing apparatuses, and particularly to computers and apparatuses that utilize nonvolatile (permanent) memory-based mass storage devices, a notable but nonlimiting example of which is mass storage devices that make use of NAND flash memory devices. FIG. 1 is schematically representative of such a mass storage drive 10 of a type known in the art. While the drive 10 can have a variety of configurations, FIG. 1 represents the drive 10 configured as an internal mass storage device for a computer or other host system (processing apparatus) equipped with a data and control bus for interfacing with the mass storage drive 10. The bus may operate with any suitable protocol in the art, preferred examples being the advanced technology attachment (ATA) bus in its parallel or serial (SATA) iterations, fiber channel (FC), small computer system interface (SCSI), and serially attached SCSI (SAS).

As understood in the art, the mass storage drive 10 is adapted to be accessed by a host system (not shown) with which it is interfaced. In FIG. 1, this interface is through a connector (host) interface 14 carried on a package or printed circuit board 12 that defines the profile of the mass storage drive 10. Access is initiated by the host system for the purposed of storing (writing) data to and retrieving (reading) data from an array 16 of solid-state nonvolatile memory devices (integrated circuits, or ICs) 18 carried on the package 12. The memory devices 18 may be, for example, NAND flash memory devices 18, which allow data retrieval and storage in random access fashion using parallel channels 24, for example, eight channels. Data pass through a memory controller/system interface (controller) 20, for example, a system on a chip (SoC) device. The controller 20 is represented as including a host bus (for example, SATA) interface controller that communicates with the host bus adapter on a motherboard, expansion card, etc., of the host system. The controller 20 is also represented as including a memory device controller capable of addressing the array 16 of memory devices 18. The controller 20 is also adapted to address a volatile memory cache 22 integrated on the drive 10. The volatile memory cache 22 may be DRAM or SRAM-based, and may optionally be integrated into the controller 20, as known and understood in the art.

Protocol signals received through the interface 14 are translated by an abstraction layer of the controller 20 that translates logical addresses into physical addresses on the memory devices 18 to which the data are written or from which they are read. The abstraction layer is connected to that portion of the controller 20 that serves as the memory controller, which performs the logic operations including data transfer and the generation of address and command signals. Even though the communication with the memory devices 18 uses the multiple parallel channels 24, these channels 24 constitute a single parallel bus between the controller 20 and the actual memory devices 18. The controller 20 is schematically represented as partitioned into distinct regions, though it should be understood that this is for illustrative purposes only.

Figure 2:
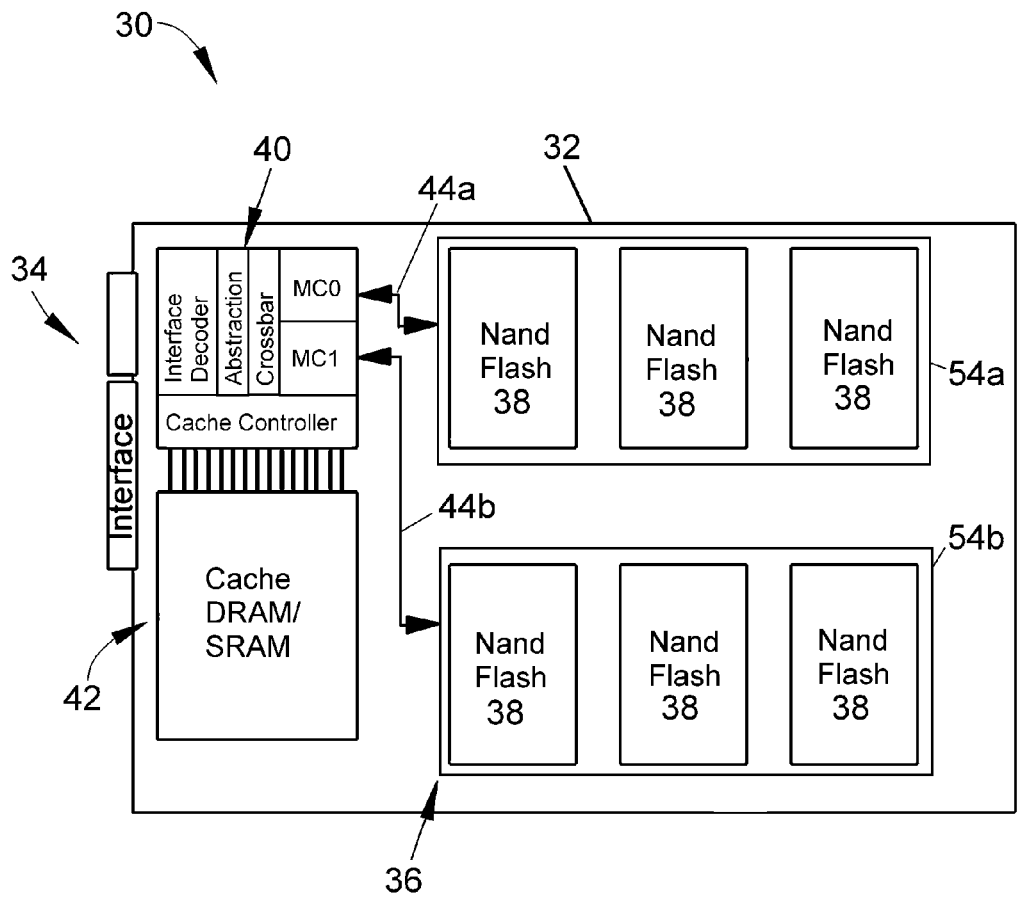
FIG. 2 schematically represents a solid-state drive comprising multiple memory banks of nonvolatile memory devices and multiple independent memory controllers according to an embodiment of the invention.

FIG. 2 shows a solid-state drive 30 according to an embodiment of the invention. The drive 30 is similar in many ways to the drive 10 of FIG. 1, including the provision for a printed circuit board 32, host interface 34, an array 36 of solid-state nonvolatile memory devices 38 (such as NAND flash or any other form of nonvolatile memory), a memory controller/system interface (controller) 40, and a volatile memory cache 42 (for example, DRAM or SRAM-based). Similar to what is represented in FIG. 1, the controller 40 of FIG. 2 could by a provided in the form of circuitry on a single IC chip, though various other configurations for the circuitry are foreseeable.

Figure 3:
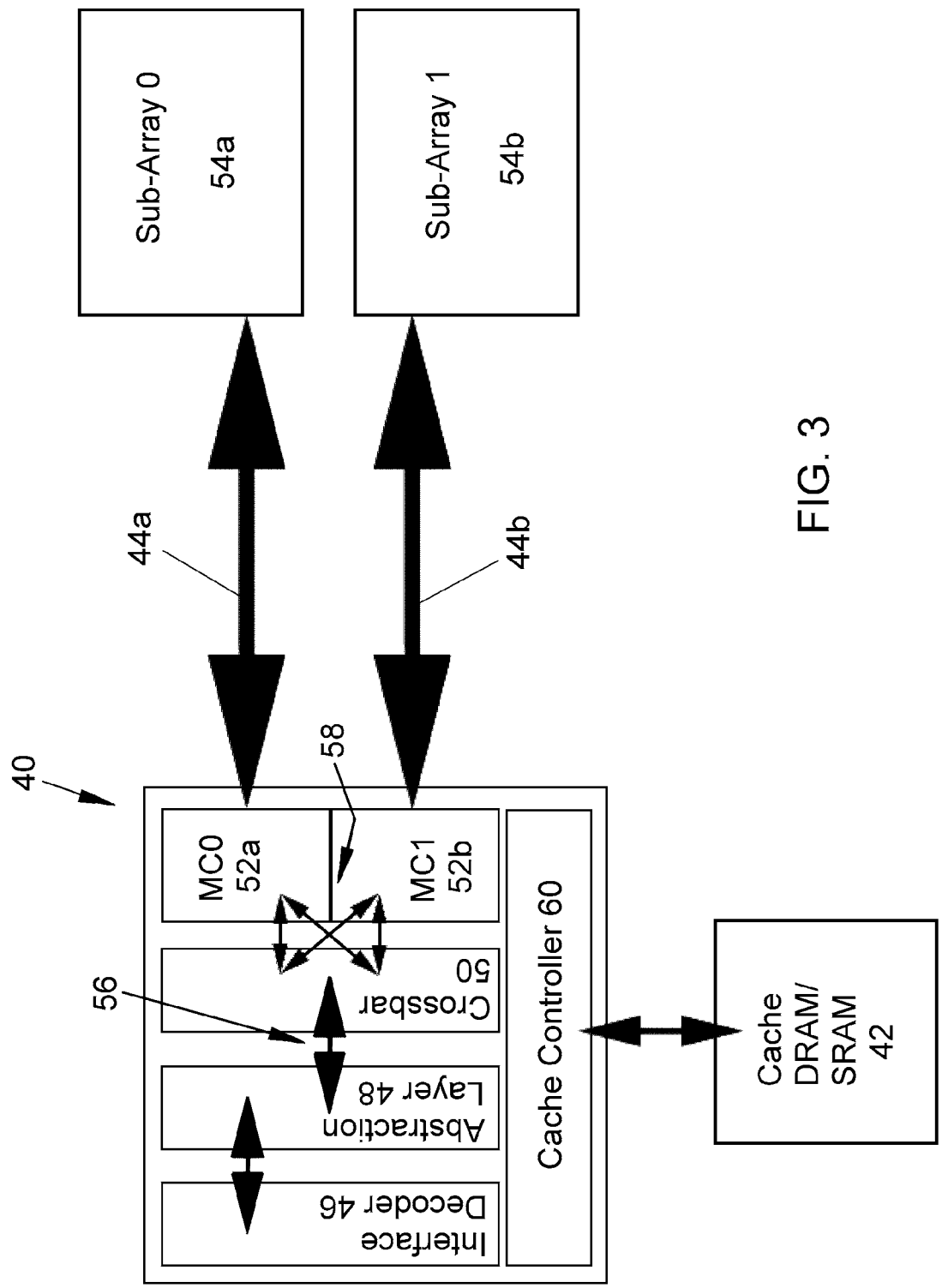
FIG. 3 schematically represents an interfacing technique that can be performed with the drive of FIG. 2 according to an embodiment of the invention.

The embodiment differs from FIG. 1 at least in part by the configuration of the controller 40, which for illustrative purposes is schematically represented in FIG. 3 as partitioned into distinct regions. In particular, the controller 40 is represented as having a host bus (for example, SATA) interface controller 46 for communicating with the host bus adapter of a host system (not shown), an abstraction layer 48 that translates logical addresses into physical addresses on the memory devices 38 to which the data are written or from which they are read, and a cache controller 60. The abstraction layer 48 is connected to a portion of the controller 40 that serves as the memory controller and performs the logic operations including data transfer and the generation of address and command signals. In contrast to the single memory controller of FIG. 1, this portion of the controller 40 is represented as comprising multiple memory control units (MC0, MC1) 52a and 52b, each of which uses a channel interface (bus) 44a or 44b comprising parallel channels, for example, eight channels. Also in contrast with FIG. 1, the controller 40 is represented as including a crossbar switch 50 for addressing separate and independent sub-arrays (banks) 54a and 54b of the nonvolatile memory devices 38. The abstraction layer 48 shares an interface 56 with the crossbar switch 50, whose interface 58 with the control units 52a and 52b is capable of addressing either control unit 52a and 52b to generate the address and control signals for the memory devices 38. In view of the controller 40 being fabricated using integrated circuit technology, the crossbar switch 50 can be implemented using semiconductor processes and structures known and currently employed to produce semiconductor crossbar switches, as well as processes and structures that may be developed in the future.

According to a preferred aspect of the invention, the two control units 52a and 52b are functionally independent from each other, and each one can address one sub-array 54a or 54b of the nonvolatile memory devices 38. The interface 56 between the crossbar switch 50 and the abstraction layer 48 preferably has much greater bandwidth, for example, twice the bandwidth, of each bus 44a and 44b between each control unit 52a and 52b and the sub-arrays 54a and 54b of nonvolatile memory devices 38. The increased bandwidth of the interface 56 can be accomplished by configuring the interface 56 as a double-width interface or by clocking the interface 56 at twice the frequency of the memory buses 44a and 44b.

With the configuration of the controller 40 represented in FIGS. 2 and 3, if large blocks of data are to be written to the drive 30, the data load can be distributed among the control units 52a and 52b to double the bus width and increase the bandwidth between the nonvolatile memory devices 38 and the controller 40. If relatively smaller blocks of data are to be written, one of the memory controllers 52a or 52b can be active and the other inactive to decrease the write amplification. If large "streaming" read requests are issued by the host system, the data will typically be distributed over the two sub-arrays 54a and 54b of nonvolatile memory devices 38, and the two control units 52a and 52b can act in tandem to maximize the data transfer from the memory devices 38 to the SATA interface 46.

In the case of random reads and writes, both control units 52a and 52b are able to independently read and write to the two sub-arrays 54a and 54b of the nonvolatile memory devices 38, which includes the capability of concurrent or simultaneous reads and writes to the sub-arrays 54a and 54b. The random accesses can be queued and their execution limited primarily by the initial access latency of the memory devices 38. According to a preferred aspect of the invention, while a random access to one of the sub-arrays 54a or 54b is in the process of being serviced, a second access to the second sub-array 54a or 54b can already be initiated, thereby resulting in two overlapping read (or write) executions from the different sub-arrays 54a or 54b.

In the case of concurrent read and write requests being queued up, the drive 30 can have read and write transfers executed simultaneously. For example, the control unit 52a can read data from the first sub-array 54a of memory devices 38 while the other unit 52b can concurrently write data to the second sub-array 54b of memory devices 38. In case data are originally scheduled to be written to a sub-array 54a or 54b that is accessed at the same time by a read request, the data can be written to the other sub-array 54a or 54b and the old data on the first sub-array 54a or 54b can be invalidated and subsequently subjected to deletion via garbage collection and TRIM.

While the invention has been described in terms of a specific embodiment, it is apparent that other forms could be adopted by one skilled in the art. For example, the physical configuration of the drive 30 (or other solid-state mass storage device) could differ from that shown, and functionally-equivalent components could be used or subsequently developed to perform the intended functions of the disclosed components of the drive 30. Therefore, the scope of the invention is to be limited only by the following claims.

The invention claimed is:

1. A nonvolatile storage device for use with a processing apparatus, the nonvolatile storage device comprising:
    a printed circuit board;
    a nonvolatile memory array comprising at least two sub-arrays that contain nonvolatile solid-state memory devices;
    control circuitry for interfacing with the processing apparatus, the control circuitry comprising an abstraction layer and at least two memory control units configured to communicate data, address and control signals with the sub arrays of the memory devices;
    a bus connecting each memory control unit to a corresponding one of the sub-arrays of the memory devices; and
    a crossbar switch that functionally connects each memory control unit to the abstraction layer.

2. The nonvolatile storage device of claim 1, wherein the crossbar switch is connected to the abstraction layer by an interface having a greater bandwidth than each of the buses connecting the memory control units to the sub-arrays of the memory devices.

3. The nonvolatile storage device of claim 2, wherein the memory control units are adapted to concurrently perform read and write operations to their respective sub-arrays of the memory devices.

4. The nonvolatile storage device of claim 2, wherein the interface between the crossbar switch and the abstraction layer is clocked at twice the data rate of each bus connecting the memory control units to the sub-arrays of the memory devices.

5. The nonvolatile storage device of claim 2, wherein the interface between the crossbar switch and the abstraction layer is twice as wide as each bus connecting the memory control units to the sub-arrays of the memory devices.

6. The nonvolatile storage device of claim 2, wherein each of the buses connecting the memory control units to their corresponding sub-arrays is a channel interface comprising parallel channels.

7. The nonvolatile storage device of claim 1, wherein the nonvolatile solid-state memory devices comprise NAND flash memory devices.

8. The nonvolatile storage device of claim 1, wherein the processing apparatus is a personal computer or workstation.

9. The nonvolatile storage device of claim 1, wherein the nonvolatile storage device is configured as a solid-state drive.

10. A method for increasing performance of a nonvolatile storage device, the method comprising:
    operating the nonvolatile storage device with at least two independent memory control units, each of the memory control units being functionally connected by a separate bus to a separate memory sub-array each containing at least one nonvolatile solid-state memory device, and both memory control units being functionally connected by a crossbar switch to a host system interface controller and an abstraction layer; and
    operating the crossbar switch so that the abstraction layer addresses either of the memory control units through the crossbar switch to generate address and control signals between either of the memory control units and the at least one nonvolatile solid-state memory device functionally connected thereto by the separate bus thereof.

11. The method of claim 10, wherein each of the memory control units is operated to independently perform read and write functions to the memory devices of its respective memory sub-array.

12. The method of claim 10, wherein each of the memory control units is operated to perform concurrent read and write accesses to the memory devices of both memory sub-arrays.

13. The method of claim 10, wherein the nonvolatile solid-state memory devices comprise NAND flash memory devices.

14. The method of claim 10, wherein the method is carried out in combination with a processing apparatus.

15. The method of claim 14, wherein the processing apparatus is a personal computer or workstation.

16. The method of claim 10, wherein the nonvolatile storage device is configured as a solid-state drive.

17. A method for increasing performance of a nonvolatile storage device, the method comprising operating the nonvolatile storage device with at least two independent memory control units, each of the memory control units being functionally connected by a separate bus to a separate memory sub-array that contains at least one nonvolatile solid-state memory device, and both memory control units being connected to a host system interface controller and an abstraction layer via a crossbar switch, wherein an interface between the abstraction layer and the crossbar switch has a greater bandwidth than each of the buses connecting the memory control units to the memory sub-arrays.

18. The method of claim 17, wherein the interface is clocked at twice the data rate of each of the buses connecting the memory control units to the memory sub-arrays.

19. The method of claim 17, wherein the interface has twice the width of each of each of the buses connecting the memory control units to the memory sub-arrays.

20. The method of claim 17, wherein each of the buses connecting the memory control units to their corresponding memory sub-arrays is a channel interface comprising parallel channels.

* * * * *